United States Patent [19]

Kindry et al.

[11] Patent Number: 4,733,708

[45] Date of Patent: Mar. 29, 1988

[54] USE OF FLAT WIRE AS A REINFORCEMENT IN THE BELT PACKAGE OF A PNEUMATIC TIRE

[75] Inventors: David A. Kindry, Clinton; Jerold R. Buenger, Hartville; Roger D. Emerson, Cuyahoga Falls; Richard M. Oblath, Akron; Roger A. Fleming, Stow, all of Ohio

[73] Assignee: The Goodyear Tire & Rubber Company, Akron, Ohio

[21] Appl. No.: 903,166

[22] Filed: Sep. 3, 1986

Related U.S. Application Data

[63] Continuation-in-part of Ser. No. 745,386, Jun. 17, 1985, abandoned, which is a continuation of Ser. No. 584,206, Feb. 27, 1984, abandoned.

[51] Int. Cl.$^4$ ............................................. B60C 09/18
[52] U.S. Cl. ..................................... 152/527; 152/531; 152/535; 152/537; 152/538
[58] Field of Search ................ 152/451, 531, 537, 527, 152/529, 528, 535, 533, 532, 536, 538; 148/12.1, 12 B; 156/117, 124

[56] References Cited

U.S. PATENT DOCUMENTS

| | | | |
|---|---|---|---|
| 2,826,233 | 3/1958 | Cooper | 152/531 |
| 3,083,749 | 4/1963 | Destinay et al. | 152/532 |
| 3,667,529 | 6/1972 | Mirtain | 152/327 |
| 3,717,191 | 2/1973 | Harrington et al. | 152/532 |
| 3,785,423 | 1/1974 | de Carbon | 152/327 |
| 3,786,851 | 1/1974 | Mirtain et al. | 152/327 |
| 3,794,097 | 2/1974 | Kind | 152/327 |
| 3,799,233 | 3/1974 | Cappa | 152/529 |
| 3,850,219 | 11/1974 | Snyder | 152/531 |
| 3,881,237 | 5/1975 | Barnett | 428/573 |
| 3,953,250 | 4/1976 | Golland et al. | 148/12 B |
| 3,960,628 | 6/1976 | Snyder | 156/213 |
| 4,011,899 | 3/1977 | Chamberlin | 152/527 |
| 4,017,338 | 4/1977 | Kozak et al. | 148/12 B |
| 4,106,957 | 8/1978 | Tournoy | 148/12 B |
| 4,328,852 | 5/1982 | Poque et al. | 152/529 X |

FOREIGN PATENT DOCUMENTS

| | | |
|---|---|---|
| 0191124 | 8/1986 | European Pat. Off. |
| 3031834 | 4/1982 | Fed. Rep. of Germany ...... 152/535 |
| 2082137 | 12/1971 | France |
| 65981 | 7/1972 | Luxembourg |
| 895313 | 5/1962 | United Kingdom |
| 1310947 | 3/1973 | United Kingdom |
| 1583540 | 1/1981 | United Kingdom |

*Primary Examiner*—Donald E. Czaja
*Assistant Examiner*—Ramon R. Hoch
*Attorney, Agent, or Firm*—L. R. Drayer

[57] ABSTRACT

The tread reinforcing belt structure (24) of a pneumatic tire (10) has at least one belt ply (29) of flat steel wire. The belt ply of flat steel wire is stiffened by other components of the tread reinforcing structure such as belt plies of steel cables (28,30). It is especially important that the axially outermost edge portions of the belt ply of flat steel wires be supported by other components of the tread reinforcing belt structure, and that the flat wire have specific cross-sectional dimensions.

14 Claims, 8 Drawing Figures

USE OF FLAT WIRE AS A REINFORCEMENT IN THE BELT PACKAGE OF A PNEUMATIC TIRE

This is a continuation-in-part of application Ser. No. 745,386, filed June 17, 1985, which is a continuation of application Ser. No. 584,206, filed Feb. 27, 1984, both now abandoned.

BACKGROUND OF THE INVENTION

The present invention relates generally to pneumatic tires, and more specifically to the tread reinforcing structures of pneumatic tires.

Pneumatic tires and other elastomeric articles are generally reinforced with cords having substantially round cross-sectional configurations. These cords either comprise a single filament or a plurality of filaments twisted together. It is also well known that these cords can be made of steel.

There has been some attempt in the prior art to specify flat wire as a reinforcement for pneumatic tires and other elastomeric products. Examples of such attempts are U.S. Pat. Nos. 4,011,899, 3,794,097 and 4,106,957.

A pneumatic tire is a complex dynamic article of manufacture and requires that the reinforcing structure go through many repeating stress strain cycles throughout its life. Therefore, it is important that the cord used in the reinforcing structure be properly designed and have the appropriate strength and fatigue properties.

There are disclosed herein structures having a combination of features which provide sufficient strength for reinforcing the tread portion of a pneumatic tire yet have sufficient ductility to provide improved fatigue characteristics.

The use of flat wires as reinforcing elements in pneumatic tires provides the tire designer with the capability of designing tires having improved running temperatures in the tread area of the tire, impact resistance, tread wear and other performance characteristics. As used herein and in the claims "flat wire" is understood to mean a single steel element having a rectangular cross section. It is understood that for the purposes of this description and the claims attached hereto the flat wire reinforcements may have either rounded corners or squared off corners and still be within the scope of this invention. (If the reinforcements are manufactured by slitting a sheet of steel, the corners may be squared; but if the reinforcements are manufactured by cold working a round wire into a rectangular reinforcement, the corners may remain rounded.) However, in order to realize these benefits it is necessary that the wire have a particular physical structure. There is disclosed herein a particular combination of structural features for a flat wire reinforcement so as to enable it to be used as a reinforcement member in pneumatic tires.

DETAILED DESCRIPTION OF THE INVENTION

Figure 2:
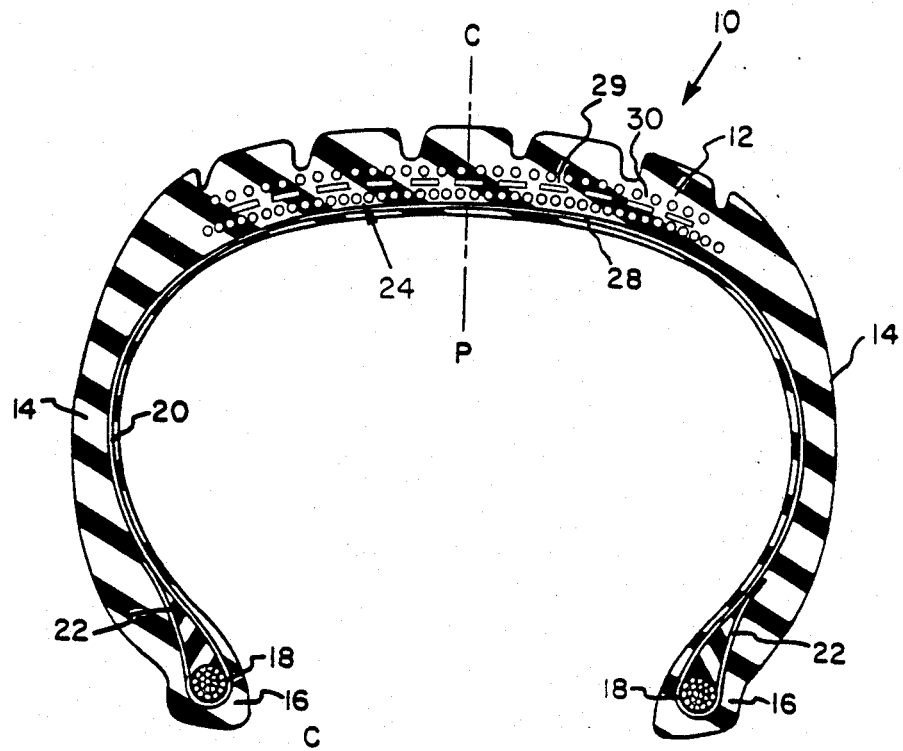
FIG. 2 is a cross-section of a tire made in accordance with a preferred embodiment of the present invention.

Referring more particularly to the drawings, there is illustrated a pneumatic passenger vehicle tire 10 having a ground-engaging tread portion 12 which merges into a pair of sidewalls 14 at each lateral edge thereof. The sidewalls 14 each extend radially inwardly and terminate in a bead portion 16 having a substantially inextensible annular reinforcing member 18 embedded therein. Extending from one bead portion 16 to the other bead portion 16 through the sidewalls 14 and tread portion 12 is a carcass reinforcing structure 20 having a pair of lateral ends 22, each of which is wrapped about a substantially inextensible annular reinforcing member 18. Disposed radially outwardly of the carcass 20 in the ground-engaging tread portion 12 is a tread reinforcing structure 24.

In the particular embodiment illustrated, the carcass reinforcing structure 20 comprises a single layer of polyester cords. The cords in the carcass reinforcing structure should be disposed in a substantially radial direction with respect to the mid-circumferential centerplane CP. That is to say, the reinforcements used as a carcass reinforcing structure should be disposed at an angle of not less than 75° with respect to the mid-circumferential centerplane, preferably of at least 85°. In the particular embodiment illustrated, the cords of the carcass ply reinforcement 20 are oriented at substantially 90° with respect to the mid-circumferential centerplane CP of the tire. It is understood that cords of any suitable material, for example nylon or steel, can be employed in the carcass reinforcing structure of a tire according to the invention, and that more than one carcass reinforcing ply may be employed if desired.

Figure 1:
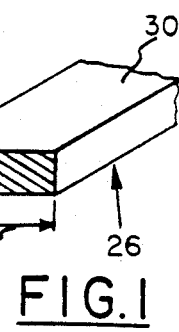
FIG. 1 is a perspective view of a portion of a flat wire reinforcement made in accordance with the present invention.

The tread reinforcing structure 24 comprises three reinforcing belt plies 28,29,30. The radially innermost and outermost belt plies 28,30 each comprise a plurality of side by side steel cables, each of which is made up of at least two steel filaments that have been twisted together. For example, tires have been manufactured using 2×0.30 steel cables in the radially inner and outer belt plies. The intermediate belt ply 29 comprises a plurality of parallel flat wire reinforcements 26 of the type illustrated in FIG. 1. The density of flat wire reinforcements 26 in intermediate belt ply 29 is between 5 and 25 ends per 2.54 cm (1 inch). Adjacent wire reinforcements should not touch each other.

Figure 3:
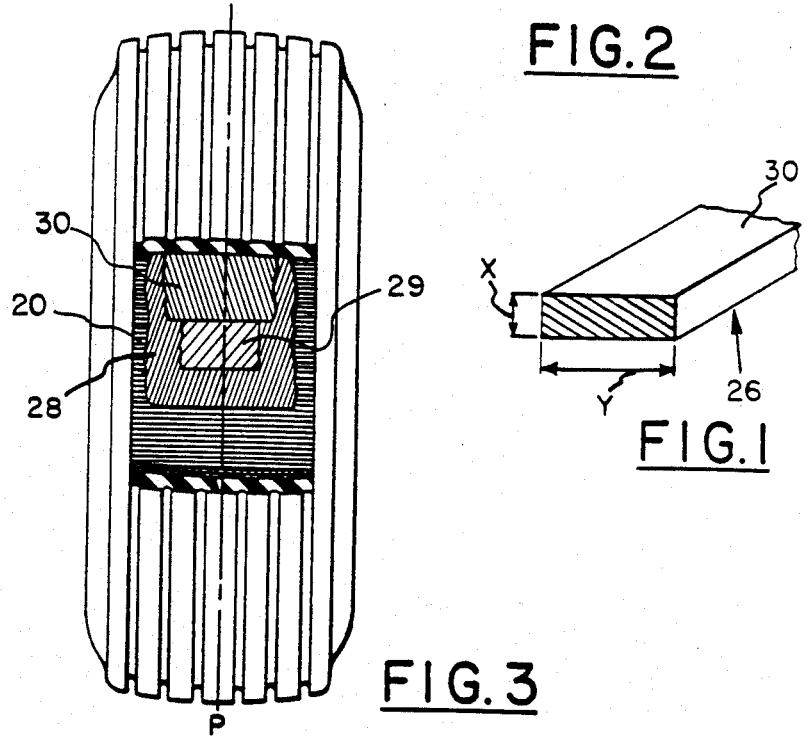
FIG. 3 is a top view of a portion of the tire of FIG. 2 with a portion cut away to show the angular disposition of the cords reinforcing the tire.

The cross-sectional shape of the flat wire reinforcements 26 when used in a belt ply is such that the thickness X is greater than or equal to 0.18 mm (0.007 inches) and less than or equal to 0.51 mm (0.02 inches) [0.18 mm $\leq X \leq 0.51$ mm] and has a width Y greater than or equal to 0.9 mm (0.035 inches) and less than or equal to 5.1 mm (0.20 inches) [0.9 mm $\leq Y \leq 5.1$ mm] and the ratio of the width Y to the thickness X is greater than or equal to 2 and less than or equal to 15 [$2 \leq Y/X \leq 15$]. Preferably, the thickness X of the flat wire reinforcements is between 0.2 mm and 0.3 mm (0.2 mm$\leq X \leq$0.3 mm) and the width Y is between 1 mm and 2 mm (1 mm$\leq Y \leq$2 mm). The ratio of the width Y to the thickness X is preferably between 3 and 9 ($3 \leq Y \leq 9$), a lower ratio being preferred because flat wires at lower ratios have performed better in tests than flat wires with higher ratios. Referring to FIG. 3, the wire cables in the radially innermost and outermost belt plies 28,30 are oriented at between 15° and 25° (preferably 18°–21° with respect to the mid-circumferential centerplane CP and are oriented in generally opposite directions with respect to the mid-circumferential centerplane of the tire. The flat wire reinforcements 26 of the intermediate belt ply 29 are oriented at between 30°–45° (preferably 37°–43°) with respect to the mid-circumferential centerplane and are oriented in the same manner as the wire cables of the radially innermost belt ply 28.

It is very important that both the radially innermost and radially outermost belt plies 28,30 extend axially outwardly of the intermediate belt ply 29 on both sides of the mid-circumferential centerplane CP of the tire. Experiments have shown that breaking or cracking of flat wire reinforcements in the belt structure of a tire occur most frequently near the axial edges of said flat wire reinforcements. The radially inner and outer belt plies reinforce these edge portions of the flat wires to greatly reduce the occurrence of such failures of the flat wires. It is also believed that the tread radius of a tire having flat wire reinforcements therein should be sufficiently large so that the distortion of the edge portions of the flat wire during operation of the tire can be reduced.

It is preferred that the flat wire reinforcements used to reinforce elastomeric articles, and in particular a pneumatic tire as illustrated, be made of a cold worked steel which has a carbon content ranging from about 0.65% to 0.90%, a pearlitic microstructure before cold working, a tensile strength equal to or greater than $1526 \times 10^6$ N/m$^2$ ($2.2 \times 10^5$ psi) and an elongation at break in the range of 1.0% to 3.5%. Applicants have found that it is very desirable that the steel reinforcements have this structure so as to obtain the appropriate strength and fatigue qualities.

In order to further improve adhesion between the flat steel wire reinforcements 26 and the rubber in which it is to be embedded, there may be provided a coating 30 of copper, zinc or brass having a thickness of at least about 0.10 microns ($1 \times 10^{-7}$m). Generally, coating 30 is not greater than about 100 microns ($1 \times 10^4$m), in the particular embodiment illustrated, coating 30 is about 20 microns ($2 \times 10^{-5}$m). If a brass coating is used, it should have a copper content ranging from about 55% to 75%. If desired, the coating 30 may be doped with a third alloy such as iron, nickel, cadmium or cobalt in the range of 0.1% to 5.0% to further improve adhesion qualities of the wire with rubber.

Figure 4:
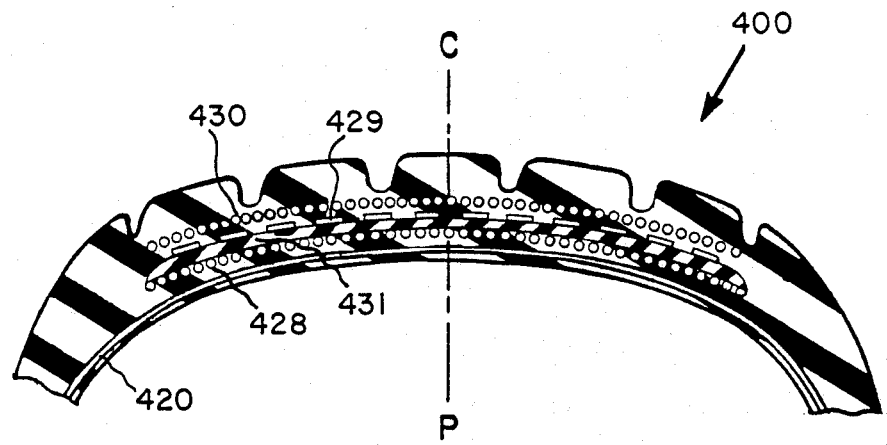
FIGS. 4–8 are cross-sectional views of the crown portions of tires made in accordance with other preferred embodiments of the present invention.

Referring next to FIG. 4, there is shown a cross-sectional view of the crown portion of a tire 400 according to another preferred embodiment of the invention. The carcass reinforcing structure 420 of this embodiment is substantially the same as the carcass reinforcing structure shown and described with respect to the embodiment in FIGS. 2 and 3. The three belt reinforcing plies 428, 429 and 430 are substantially the same as the belt reinforcing plies shown and described with respect to the embodiment in FIGS. 2 and 3. However, in the present embodiment an extra layer 431 of an elastomeric material is interposed between the first belt ply 428 and the second belt ply 429. This elastomeric material contains 3% to 10% by weight, preferably 4% to 5%, of aramid pulp.

This additional layer of elastomeric material acts to stiffen the belt structure, especially the axially outermost edge portions of the flat wire belt 429. It is understood that such a layer of elastomeric material may be employed with all of the other preferred embodiments to be described herein without deviating from the scope of the invention.

Figure 5:
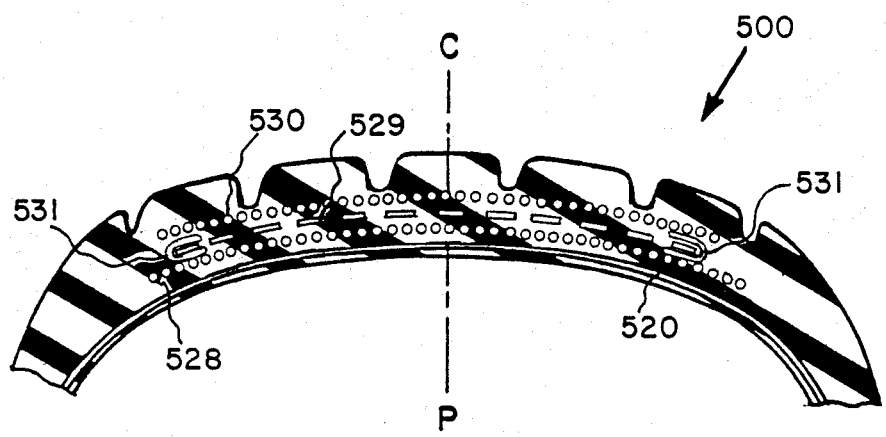

Referring next to FIG. 5, there is shown a cross-sectional view of the crown portion of a tire 500 according to another preferred embodiment of the invention. The carcass reinforcing structure 520 of the embodiment is substantially the same as the carcass reinforcing structure shown and described with respect to the embodiment in FIGS. 2 and 3. The belt reinforcing plies 528, 529 and 530 are substantially the same as the belt reinforcing plies shown and described with respect to the embodiment in FIGS. 2 and 3. However, in the present embodiment a belt edge strip 531 is folded around each of the edges of the belt ply of flat steel wires 529. The belt edge strips 531 are each reinforced with nonmetallic cords of any suitable material such as nylon. These nonmetallic cords may be incorporated into a square woven or leno-weave fabric. The function of the belt edge strips is to reinforce the axial edge portions of the flat wire belt and prevent damage of the flat wire belt during the operation of the tire. The belt edge strips should extend at least 10 mm ($\frac{3}{8}$ inch) axially inwardly from each belt edge, preferably between 10 mm ($\frac{3}{8}$ inch) and 16 mm ($\frac{3}{8}$ inch). It is understood that belt edge strips may be employed with other preferred embodiments without deviating from the scope of the invention.

Figure 6:
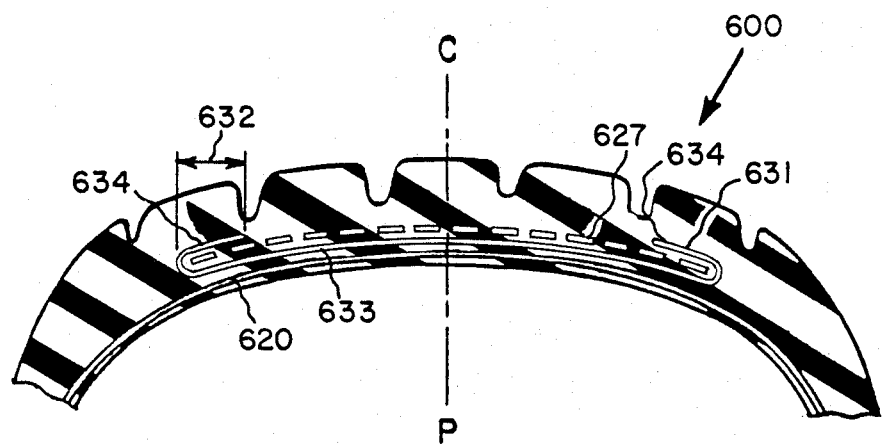

Referring next to FIG. 6, there is shown a cross-sectional view of the crown portion of a tire 600 according to another preferred embodiment of the invention. The carcass reinforcing structure 620 of this embodiment is substantially the same as the carcass reinforcing structure shown and described with respect to the embodiment in FIGS. 2 and 3. The belt ply of flat wire 627 is substantially the same as the belt ply of flat wire shown and described with respect to the embodiment in FIGS. 2 and 3. However, in this embodiment there is a first belt ply 631 which is divided into a central portion 633 and a pair of axial edge portions 634, and a second belt ply 627 of flat steel wires (as already described herein) disposed in juxtaposition with and radially outwardly of the central portion of the first belt ply. The axial edge portions 634 of the first belt ply are folded radially outwardly and axially inwardly around the second belt ply for a distance 632 of at least 19 mm ($\frac{3}{4}$ inch). Preferably the width of the axial edge portions 634 of the first belt ply is in the range of 19 mm ($\frac{3}{4}$ inch) 32 mm ($1\frac{1}{4}$inch), and the edges of the first belt ply are disposed at least 7.6 mm (0.3 inch) from the nearest traction groove of the tread portion of the tire. The first belt ply is reinforced with elements of any suitable material, for example steel cables, fiberglass cords, or even hybrid cords of aramid and nylon combinations. The reinforcing elements of the first belt ply are oriented in the range of 15° to 25° with respect to the mid-circumferential centerplane of the tire. This embodiment also has the advantage over the prior art of reinforcing the axial edge portions of the flat wire belt ply, which in the prior art were vulnerable to damage during use.

Figure 7:
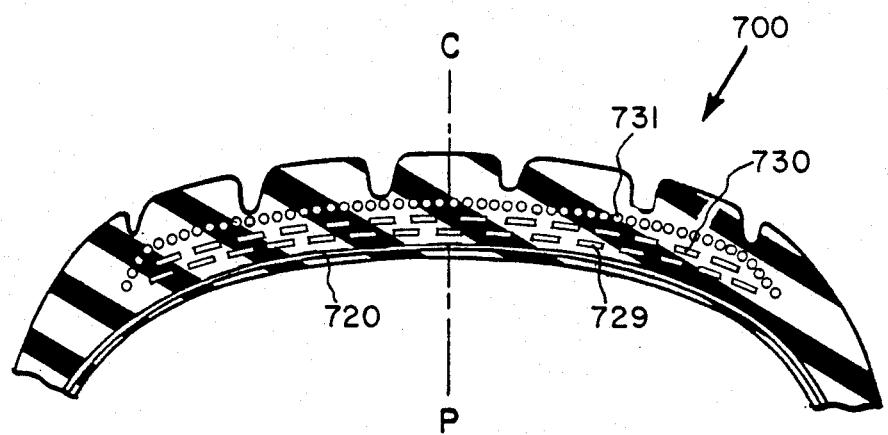

Referring next to FIG. 7, there is shown a cross-sectional view of the crown portion of a tire 700 according to another preferred embodiment of the invention. The carcass reinforcing structure 720 of this embodiment is substantially the same as the carcass reinforcing structure shown and described with respect to the embodiment in FIGS. 2 and 3. However, this embodiment has two belt plies of flat steel wire 729,730 which are each substantially the same as the flat wire belt shown and described with respect to the embodiment in FIGS. 2 and 3, with the exception that the flat wires in the belt plies are oriented in opposite directions with respect to the mid-circumferential centerplane CP of the tire. This embodiment further comprises a ply 731 of nonmetallic cords in juxtaposition with and radially outwardly of the radially outermost belt ply 730. These nonmetallic cords are oriented at between 0° and 10° with respect to the mid-circumferential centerplane of the tire, and this ply of nonmetallic cords extends axially outwardly of all the other belt plies of the tread reinforcing structure on both sides of the mid-circumferential centerplane of the tire. Preferably the nonmetallic cords are of a heat shrinkable material such as nylon. This additional ply of low angle nonmetallic cords acts to secure the axial edge portions of the flat wire belt plies in place during operation of the tire. It is understood that such a ply of low angle nonmetallic cords may be disposed radially outwardly of the radially outermost belt ply of the other preferred embodiments described herein.

Figure 8:
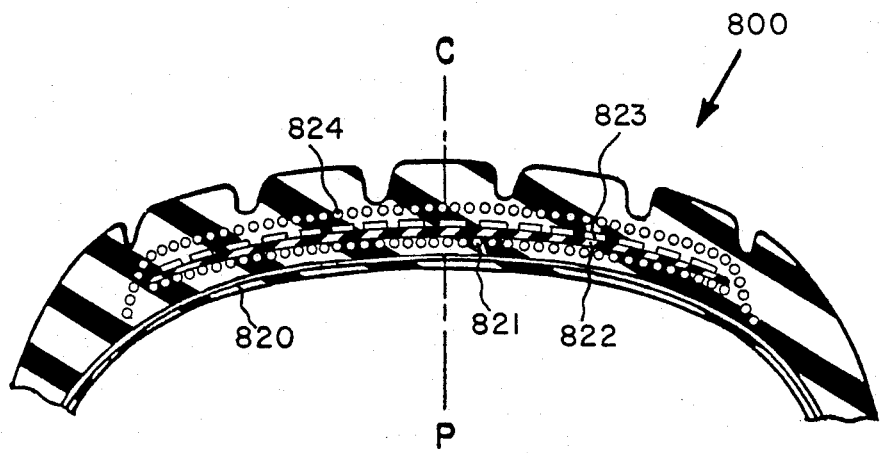

With reference to FIG. 8, there is shown a cross-sectional view of the crown portion of a tire 800 according to another embodiment of the invention. The carcass reinforcing structure 820 of this embodiment is substantially the same as the carcass reinforcing structure shown and described with respect to the embodiment in FIGS. 2 and 3. The tread reinforcing structure of this embodiment comprises four components 821,822,823,824. A first belt ply 821 comprises side by side steel cables oriented at an angle of between 15° and 25°, preferable 17° to 21°, with respect to the mid-circumferential centerplane of the tire. A preferred construction of the steel cables in the first belt ply is 2×0.30. A layer 822 of an elastomeric material which contains 3% to 10% by weight (preferably 4% to 5%) of aramid pulp is disposed in juxtaposition with and radially outwardly of the first belt ply 821. A second belt ply 823 is disposed in juxtaposition with and radially outwardly of said layer of elastomeric material 822. This second belt ply comprises side by side flat steel wires of the type already described herein, with said flat steel wires disposed at 27° to 35°, preferably 28° to 32° with respect to the mid-circumferential centerplane of the tire. A ply of nonmetallic cords 824 is disposed in juxtaposition with and radially outwardly of said second belt ply 823, with the nonmetallic cords oriented at between 0° and 10° with respect to the mid-circumferential centerplane of the tire. The nonmetallic cords are preferably of a heat shrinkable material such as nylon. Preferably, the steel cables of the first belt ply 821 and the flat wires of the second belt ply 823 are oriented in generally opposite directions with respect to the mid-circumferential centerplane of the tire. It is further preferred that the tread reinforcing structure be symmetrical with respect to the mid-circumferential centerplane, and that: the axial width of the layer of elastomeric material 822 is less than the axial width of the first belt ply 821; the axial width of the second belt ply 823 is less than the axial width of the layer of elastomeric material 822; and the axial width of the ply of nonmetallic cords 824 is greater than the axial width of the first belt ply 821.

It is believed that the herein disclosed combinations of a fabric reinforced carcass structure and a tread reinforcing belt structure having flat steel wire reinforcing members can provide a significant improvement in tread wear and reduced heat generation in the belt area of the tire while maintaining or slightly improving other ride performance characteristics.

An important aspect of the present invention is that the material of the flat wire be of a particular composition, as previously set forth, and have a particular dimensional size relationship depending on its use in the carcass structure or in the belt reinforcing structure. It is this combination of features which enables a pneumatic tire comprising flat wire to obtain desirable performance characteristics.

It is understood that modifications to the present invention could be made without departing from the scope of the present invention. For example, the outer surface of the wire reinforcement may be provided with small indentations or grooves for better adhesion to the rubber.

We claim:

1. A pneumatic tire having a tread reinforcing structure comprising:
   (a) a first belt ply comprising side by side steel cables, said steel cables being oriented at an angle of between 15° and 25° with respect to the mid-circumferential centerplane of the tire;
   (b) a second belt ply disposed radially outwardly of said first belt ply and comprising side by side flat steel wires, said flat steel wires having a thickness in the range of 0.18 mm to 0.51 mm and a width in the range of 0.9 mm to 5.1 mm and having a ratio of width to thickness in the range of 3 to 9, said flat steel wires being disposed at an angle in the range of 30° to 45° with respect to the mid-circumferential centerplane of the tire; and
   (c) a third belt ply disposed radially outwardly of the second belt ply and comprising side by side steel cables, said steel cables being oriented at an angle of between 15° and 25° with respect to the mid-circumferential centerplane of the tire, the first and third belt plies both extending axially outwardly of the second belt ply on both sides of the mid-circumferential centerplane of the tire.

2. A pneumatic tire according to claim 1 wherein said tread reinforcing structure further comprises a layer of an elastomeric material interposed between the first and second belt plies, said elastomeric material containing aramid pulp.

3. A pneumatic tire according to claim 1 wherein said tread reinforcing structure further comprises a pair of belt edge strips, one of said belt edge strips being folded around each axial edge of the second belt ply, said belt edge strips comprising nonmetallic cords.

4. A pneumatic tire according to claim 1 wherein the steel cables of the first and third belt plies are oriented in generally opposite directions with respect to the mid-circumferential centerplane of the tire, and the flat wires of the second belt ply are oriented in the same manner as the steel cables of the first belt ply.

5. A pneumatic tire according to claim 2 wherein the steel cables of the first and third belt plies are oriented in generally opposite directions with respect to the mid-circumferential centerplane of the tire, and the flat wires of the second belt ply are oriented in the same manner as the steel cables of the first belt ply.

6. A pneumatic tire according to claim 3 wherein the steel cables of the first and third belt plies are oriented in generally opposite directions with respect to the mid-circumferential centerplane of the tire, and the flat wires of the second belt ply are oriented in the same manner as the steel cables of the first belt ply.

7. A pneumatic tire according to any one of claims 1 to 6 wherein said flat steel wires comprise cold worked steel having a carbon content ranging from 0.65% to 0.90%, a pearlitic microstructure before cold working, a tensile strength of at least $1526 \times 10^6 \text{n/m}^2$ and an elongation at break in the range of 1.0% to 3.5%.

8. A pneumatic tire according to any one of claims 1 to 6 further comprising a ply of nonmetallic cords in juxtaposition with and radially outwardly of said third belt ply, said nonmetallic cords being oriented at between 0° and 10° with respect to the mid-circumferential centerplane of the tire.

9. A pneumatic tire according to claim 7 further comprising a ply of nonmetallic cords in juxtaposition with and radially outwardly of said third belt ply, said nonmetallic cords being oriented at between 0° and 15° with respect to the mid-circumferential centerplane of the tire.

10. A pneumatic tire having a tread reinforcing structure comprising:
   (a) a first belt ply comprising side by side steel cables, said steel cables being oriented at an angle of between 15° and 25° with respect to the mid-circumferential centerplane of the tire;
   (b) a layer of an elastomeric material in juxtaposition with and radially outwardly of said first belt ply, said elastomeric material containing aramid pulp;
   (c) a second belt ply in juxtaposition with and radially outwardly of said layer of elastomeric material, said second belt ply comprising side by side flat steel wires, said flat steel wires having a thickness in the range of 0.18 mm to 0.51 mm and a width in the range of 0.9 mm to 5.1 mm and having a ratio of width to thickness in the range of 3 to 9, said flat steel wires being disposed at an angle in the range of 27° to 35° with respect to the mid-circumferential centerplane of the tire; and
   (d) a ply of nonmetallic cords in juxtaposition with and radially outwardly of said second belt ply, said nonmetallic cords being oriented at between 0° and 10° with respect to the mid-circumferential centerplane of the tire.

11. A pneumatic tire according to claim 10, wherein the flat steel wires of the second belt ply comprise cold worked steel having a carbon content ranging from 0.65% to 0.90%, a pearlitic microstructure before cold working, a tensile strength of at least $1526 \times 10^6 \text{ n/m}^2$ and an elongation at break in the range of 1.0% to 3.5%.

12. A pneumatic tire according to either of claims 10 or 11 wherein the steel cables of the first belt ply and the flat wires of the second belt ply are oriented in generally opposite directions with respect to the mid-circumferential centerplane of the tire.

13. A pneumatic tire according to either of claims 10 or 11 wherein the axial width of said layer of elastomeric material is less than the axial width of the first belt ply, the axial width of the second belt ply is less than the axial width of said layer of elastomeric material, and the axial width of said ply of nonmetallic cords is greater than the axial width of said first belt ply.

14. A pneumatic tire according to claim 12 wherein the axial width of said layer of elastomeric material is less than the axial width of the first belt ply, the axial width of the second belt ply is less than the axial width of said layer of elastomeric material, and the axial width of said ply of nonmetallic cords is greater than the axial width of said first belt ply.

* * * * *